(12) United States Patent
Yoo

(10) Patent No.: US 8,990,931 B2
(45) Date of Patent: Mar. 24, 2015

(54) SYSTEM-ON-A-CHIP MALICIOUS CODE DETECTION APPARATUS FOR A MOBILE DEVICE

(75) Inventor: In Seon Yoo, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 142 days.

(21) Appl. No.: 13/263,914

(22) PCT Filed: Mar. 26, 2010

(86) PCT No.: PCT/KR2010/001851
§ 371 (c)(1),
(2), (4) Date: Oct. 11, 2011

(87) PCT Pub. No.: WO2010/117153
PCT Pub. Date: Oct. 14, 2010

(65) Prior Publication Data
US 2012/0036572 A1  Feb. 9, 2012

(30) Foreign Application Priority Data

Apr. 9, 2009  (KR) .................. 10-2009-0030669

(51) Int. Cl.
*G06F 21/56*  (2013.01)
*H04L 29/06*  (2006.01)
(52) U.S. Cl.
CPC ............ *G06F 21/567* (2013.01); *G06F 21/564* (2013.01); *H04L 63/14* (2013.01); *H04L 63/145* (2013.01); *H04L 63/02* (2013.01)
USPC .................. 726/22; 726/23; 726/24; 713/188

(58) Field of Classification Search
None
See application file for complete search history.

(56) References Cited

U.S. PATENT DOCUMENTS

| 6,625,740 | B1 * | 9/2003 | Datar et al. ................... 713/324 |
| 7,549,055 | B2 * | 6/2009 | Zimmer et al. ............... 713/188 |
| 2004/0059943 | A1 * | 3/2004 | Marquet et al. .............. 713/201 |
| 2008/0229419 | A1 * | 9/2008 | Holostov et al. ............... 726/24 |
| 2009/0064337 | A1 * | 3/2009 | Chien ............................ 726/25 |

FOREIGN PATENT DOCUMENTS

WO  WO 2006046896 A1 *  5/2006

* cited by examiner

*Primary Examiner* — Alexander Lagor
(74) *Attorney, Agent, or Firm* — Sughrue Mion, PLLC

(57) ABSTRACT

System-on-chip (SoC)-based apparatus for detecting malicious code in portable terminal is provided. SoC-based apparatus includes SoC including central processing unit (CPU) configured to generally control respective units of SoC for SoC-based malicious code detection, SoC memory-based firewall configured to classify packets input from outside through network interface unit, perform filtering operation, such as allowing operation and dropping operation, on the classified packets according to a predetermined setting, and output the result of the filtering operation to an application memory or an anti-malware engine, the SoC memory-based anti-malware engine configured to detect malicious code by performing a pattern-matching operation between a code pattern in a file input from the firewall and a pattern of malicious code registered in a malware signature database (DB) of a mobile device application unit, and an SoC memory-based control module configured to control operation of the firewall and the anti-malware engine in connection with the CPU.

10 Claims, 2 Drawing Sheets

SYSTEM-ON-A-CHIP MALICIOUS CODE DETECTION APPARATUS FOR A MOBILE DEVICE

CROSS-REFERENCE TO RELATED APPLICATION

This application claims priority to and the benefit of Korean Patent Application No. 10-2009-0030669, filed on Apr. 9, 2009, the disclosure of which is incorporated herein by reference in its entirety.

BACKGROUND

1. Field

A firewall and an anti-malware engine are constructed on the basis of a memory of an SoC in consideration of resources and performance improvement of the portable terminal to detect malicious code introduced into the portable terminal.

2. Description of the Related Art

As their widespread proliferation continues, portable terminals such as smartphones, personal digital assistants (PDAs), wireless broadband (WiBro) terminals, etc. are becoming necessities of modern life. Countless people use portable terminals (mobile devices) to communicate with one another, to exchange information, and also to exchange important business information through voice and data communication.

However, as the hardware functions of portable terminals expand and improve, application programs executed in the portable terminals become more diverse and complicated. This increases the likelihood of existing malicious codes that have attacked computers causing serious damage to portable terminals also. In particular, the widespread proliferation of wireless portable Internet services such as WiBro has led to the advent of mobile malicious code (mobile malware) that attacks vulnerabilities in application programs and services for portable terminals such as Bluetooth, multimedia messaging system (MMS), etc., in addition to malicious code that attacks vulnerabilities in existing computer application programs.

Examples of mobile malicious code include the Timofonica worm, whose name is a modification of Telefonica, I-mode malicious code, and viruses (Phage, Vapor, and Liberty) operating in a short message service (SMS) and Palm operating system (OS).

Various types of malicious code may cause portable terminals to malfunction and may also cause serious problems such as deletion of data and leakage of personal information. Thus, countermeasures are required to effectively protect portable terminals from various malicious codes.

Anti-malware solutions applied to existing portable terminals are based on software, and the way in which they operate is as follows. A software-based vaccine program basically involves an anti-malware engine and a signature matching unit, and has a structure in which a virus signature database (DB) is periodically updated.

When scanning files in such a structure, anti-virus software searches for files that match signatures in the database to check whether or not the files are infected with a virus or to detect abnormal files. Also, firewalls applied to existing portable terminals block all network access attempts from the outside or network connection with a specific external program according to whether or not a policy has been established.

In this way, the anti-malware solutions applied to existing portable terminals are constructed on the basis of software and used in mobile devices without modification. However, mobile devices have relatively many limitations with respect to resources such as a central processing unit (CPU) and a battery. Thus, when the existing model is used as is, performance deterioration makes it inconvenient for a user to perform any operation other than malicious code detection.

Furthermore, when using a software-based virus vaccine solution for existing portable terminals, performance deterioration makes it difficult to monitor all packets received via a network.

SUMMARY OF THE INVENTION

The present invention is directed to providing an apparatus for detecting malicious code introduced into a portable terminal by constructing a firewall and an anti-malware engine on the basis of a memory of a system-on-chip (SoC) and changing a virus signature database (DB) to reflect region, in order to fundamentally solve performance deterioration of a software-based virus vaccine solution and overcome the limitations of a narrow malware signature (malicious code signature) DB based on a software scheme.

According to an aspect of the present invention, there is provided an apparatus for detecting malicious code in a portable terminal including an SoC. The SoC includes: a central processing unit (CPU) configured to generally control respective units of the SoC for SoC-based malicious code detection; an SoC memory-based firewall configured to classify packets input from the outside through a network interface unit, perform a filtering operation, such as an allowing operation and a dropping operation, on the classified packets according to a predetermined setting, and output the result of the filtering operation to an application memory or an anti-malware engine; the SoC memory-based anti-malware engine configured to detect malicious code by performing a pattern-matching operation between a code pattern in a file input from the firewall and a pattern of malicious code registered in a malware signature DB of a mobile device application unit; and an SoC memory-based control module configured to control operation of the firewall and the anti-malware engine in connection with the CPU.

The mobile device application unit interoperating with the SoC may be constructed in the application memory to update a vaccine version, and select a connection method according to a network used by a server.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DESCRIPTION OF MAJOR SYMBOLS IN THE ABOVE FIGURES

| | |
|---|---|
| 100: SoC | 110: CPU |
| 120: Network interface unit | 130: SoC memory |
| 131: Firewall | 131A: Packet identification unit |
| 131B: Packet filtering unit | 132: Anti-malware engine |
| 133: Control module | 140: I/O interface unit |
| 150: Memory interface unit | 160: Peripheral device |
| 200: Application memory | 210: Mobile device application unit |

-continued

| | |
|---|---|
| 211: Application module | 211A: Version sync module |
| 211B: Update module | 211C: Center connection module |
| 212: DB information unit | 212A: Center URL information unit |
| 212B: Device information unit | 212C: Malware signature DB |

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
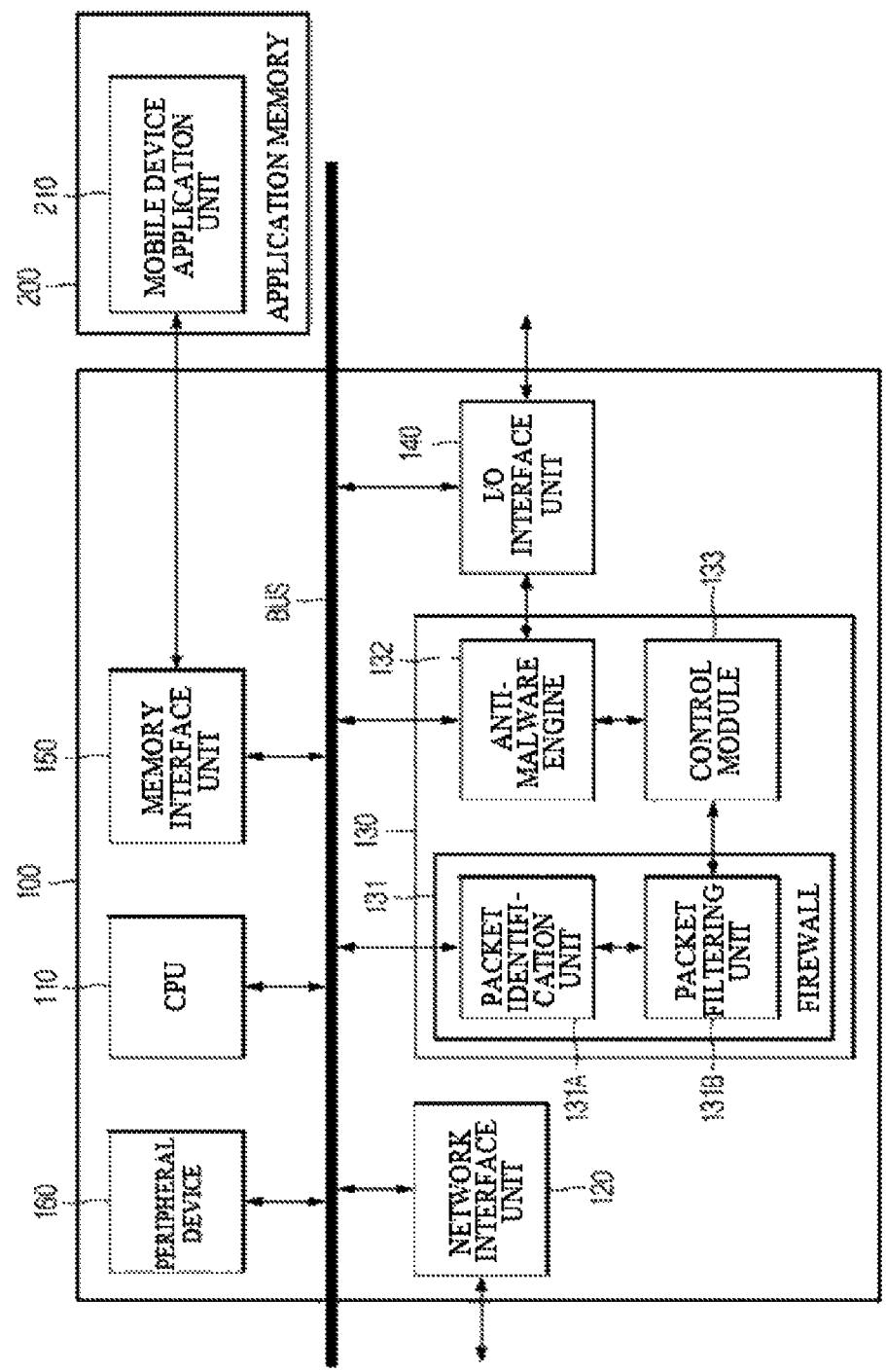
FIG. 1 is a block diagram of a system-on-chip (SoC)-based apparatus for detecting malicious code in a portable terminal according to an exemplary embodiment of the present invention.

FIG. 1 is a block diagram of a system-on-chip (SoC)-based apparatus for detecting malicious code in a portable terminal according to an exemplary embodiment of the present invention. As shown in the drawing, the SoC-based apparatus includes a central processing unit (CPU) 110, a network interface unit 120, an SoC memory 130, an input/output (I/O) interface unit 140, a memory interface unit 150, and a peripheral device 160 constructed on an SoC 100, and a mobile device application unit 210 on an application memory 200 connected with the SoC 100 through the memory interface unit 150 to interoperate with the SoC 100.

The SoC 100 is installed on a main printed circuit board (PCB) of the portable terminal, and interoperates with the mobile device application unit 210 constructed on the application memory 200. The SoC 100 operates in an autonomous monitoring mode programmed in advance according to normal operation state regulations for I/O data flow, and a mode in which input and output channels are disabled when a current state departs from the requirements of the normal state.

The CPU 110 serves to generally control operation of the respective components constructed on the SoC 100, that is, the network interface unit 120, the SoC memory 130, the I/O interface unit 140, the memory interface unit 150, and the peripheral device 160. Also, the CPU 110 serves to control a firewall 131, an anti-malware engine 132, and a control module 133 based on the SoC memory 130 to detect malicious code, as will be described later, in a proper cycle or at a proper point in time in consideration of battery power consumption.

The network interface unit 120 serves to transfer packets that are newly received from the outside and will be stored the application memory 200 to the SoC memory 130 under the control of the CPU 110.

As an area in which components (code) that can be corrected or complemented later and detect malicious code are constructed, the SoC memory 130 includes the firewall 131 including a packet identification unit 131A and a packet filtering unit 131B, the anti-malware engine 132, and the control module 133.

In the firewall of the SoC memory 130, the packet identification unit 131A classifies input packets and outputs the classified packets to the packet filtering unit 131B. At this time, the packet filtering unit 131B performs a filtering operation, such as an allowing operation and a dropping operation, on the input packets according to a setting of the application memory 200.

Under the control of the CPU 110 and the control module 133, the packets filtered by the packet filtering unit 131B are stored in the application memory 200 through an internal bus and the memory interface unit 150, or transferred to the anti-malware engine 132 through the internal bus. In the application memory 200, an operating system (OS) and various kinds of programs used in a mobile device are loaded.

The anti-malware engine 132 performs a malware detection operation on a packet-filtered file output from the packet filtering unit 131B and a file newly input from the I/O interface unit 140. A malware signature database (DB) 212C is constructed on a DB information unit 212 of the mobile device application unit 210, and the anti-malware engine 132 performs a pattern matching operation between patterns of malicious code registered in the malware signature DB 212C and a code pattern in a file input through the route to detect malicious code.

The control module 133 controls operation of the firewall 131 and the anti-malware engine 132 in connection with the CPU 110, so that the firewall 131 and the anti-malware engine 132 operate as described above.

The SoC 100 operating as described above is updated when firewall code, code of the anti-malware engine 132, etc. is changed or modified via a network.

Figure 2:
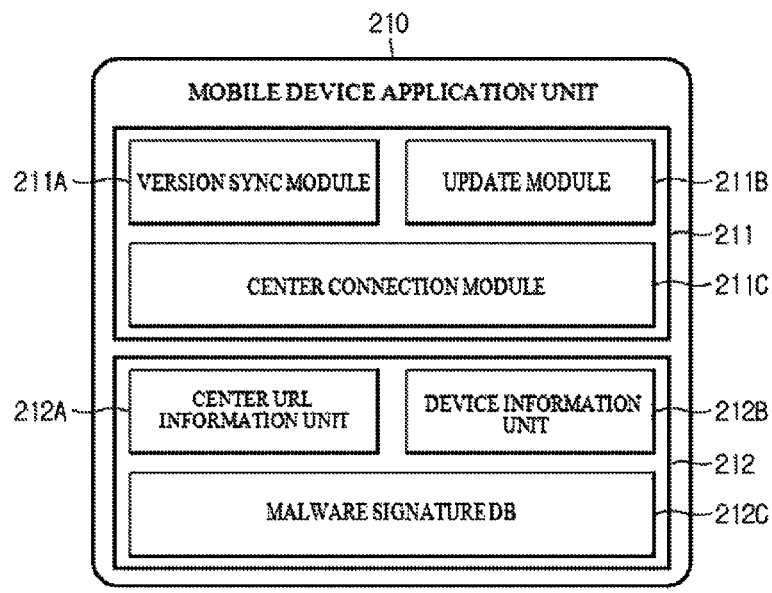
FIG. 2 is a detailed block diagram of a mobile device application unit of FIG. 1.

FIG. 2 shows a constitution of the mobile device application unit 210 constructed on the application memory 200 and interoperating with the SoC 100. As shown in the drawing, the mobile device application unit 210 schematically includes an application module 211 and the DB information unit 212.

The application module 211 includes a version sync module 211A, an update module 211B, and a center connection module 211C, and the DB information unit 212 includes a center uniform resource locator (URL) information unit 212A, a device information unit 212B, and the malware signature DB 212C.

The version sync module 211A compares a vaccine version of a server with that of the portable terminal at predetermined periods, and operates the update module 211B to update a vaccine of the portable terminal with the latest version of the server when the vaccine versions of the server and the portable terminal differ. Also, the version sync module 211A operates the update module 211B to update the vaccine version of the portable terminal when a malware signature DB of the server needs to be updated.

In this way, the vaccine version needs to be frequently updated on the basis of continuously occurring vulnerabilities, so that a security policy is kept effective.

The version sync module 211A also operates the update module 211B to update the vaccine of the portable terminal with the latest version when the malware signature DB of the server needs to be updated.

When several connection methods are given to a user, the center connection module 211C prioritizes the connection methods and selects a connection method according to a network used by the server. For example, when wireless fidelity (WiFi) can be used, the center connection module 211C enables access to a center URL by use of WiFi instead of selecting a mobile communication company. At this time, the center URL information unit 212A is used to connect the portable terminal with the network of the server through the network interface unit 120 using the selected connection method, for example, a wireless local area network (LAN) (e.g., WiFi) or a mobile communication company.

The device information unit 212B serves to maintain pieces of information required by the corresponding device.

An exemplary embodiment of the present invention is configured on an SoC on the basis of a memory in the SoC to detect malicious code introduced into a portable terminal, thereby improving virus scanning and matching performance. Thus, it is possible to perform a virus vaccine service while performing another operation on a mobile device.

Also, since all packets can be monitored through a firewall configured on the basis of the memory in the SoC, the mobile device can be maintained in a safe state from a mobile virus.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

SEQUENCE LIST FREE TEXT mobile device, anti-malware, system-on-chip (SoC), firewall, anti-malware engine

What is claimed is:

1. A system-on-chip (SoC)-based apparatus for detecting malicious code in a mobile device, comprising a mobile device SoC,
   wherein the mobile device SoC includes:
   a central processing unit (CPU) configured to control respective units of the mobile device SoC for SoC-based malicious code detection;
   a mobile device SoC memory-based firewall configured to classify packets input from the outside through a network interface unit, and perform a filtering operation including an allowing operation and a dropping operation on the classified packets according to a predetermined setting, wherein when the mobile device SoC memory-based firewall performs the allowing operation according to the predetermined operation, the mobile device SoC memory-based firewall outputs the classified packets to a mobile device SoC memory-based anti-malware engine;
   the mobile device SoC memory-based anti-malware engine configured to detect malicious code by performing a pattern-matching operation between a code pattern in a file input from the firewall according to the allowing operation or a code pattern in a file input from an input/output (I/O) interface unit and a pattern of malicious code registered in a malware signature database (DB) of a mobile device application unit external to the mobile device SoC;
   a mobile device SoC memory-based control module configured to control operation of the firewall and the anti-malware engine in connection with the CPU, and
   wherein the application memory comprises the mobile device application unit and is configured to load an operating system for the mobile device; and
   wherein the mobile device application unit includes an application module configured to compare a vaccine version of a server with that of the mobile device at predetermined periods, and operate an update module to update a vaccine of the mobile device with the latest version of the server when the vaccine versions of the server and the mobile device differ.

2. The SoC-based apparatus of claim 1, wherein a mobile device SoC memory is connected with the outside through the network interface unit, and connected with the mobile device application unit through a memory interface unit.

3. The SoC-based apparatus of claim 1, wherein the firewall includes:
   a packet identification unit configured to classify the input packets; and a packet filtering unit configured to perform the filtering operation including the allowing operation and the dropping operation on the input packets according to the setting in the application memory.

4. The SoC-based apparatus of claim 1, wherein the mobile device SoC is updated when firewall code or code of the anti-malware engine is changed or modified via a network.

5. The SoC-based apparatus of claim 1, wherein the mobile device application unit is constructed on the application memory.

6. The SoC-based apparatus of claim 1, wherein the application module includes a center connection module configured to, when several connection methods are given to a user, prioritize the connection methods and select a connection method according to a network used by the server.

7. The SoC-based apparatus of claim 6, wherein the mobile device application unit includes a DB information unit including:
   a center uniform resource locator (URL) information unit configured to connect the mobile device with the network of the server through the network interface unit using the selected connection method;
   a device information unit configured to maintain pieces of information required by the corresponding device; and
   the malware signature DB configured to store and manage a pattern of malicious code for malicious code detection.

8. The SoC-based apparatus of claim 1, wherein the mobile device SoC memory-based firewall is configured to perform the filtering operation according to the predetermined setting set in the mobile device application unit external to the mobile device SoC.

9. The SoC-based apparatus of claim 1, wherein the application memory comprises the mobile device application unit and is configured to store network packets that pass through the mobile device SoC memory-based firewall.

10. The SoC-based apparatus of claim 1, wherein the mobile device SoC memory-based anti-malware engine is configured to detect the malicious code in the file input from the firewall and is configured to detect malicious code in the file input from the I/O interface unit without passing through the firewall.

* * * * *